United States Patent
Baker et al.

(10) Patent No.: US 6,598,143 B1
(45) Date of Patent: Jul. 22, 2003

(54) METHOD TO INCREASE PERFORMANCE OF ACQUIRING FREE MEMORY PAGES

(75) Inventors: William Eugene Baker, Austin, TX (US); Bret Ronald Olszewski, Austin, TX (US); Jeffrey Anderson Smith, Pflugerville, TX (US); David Blair Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,819

(22) Filed: Feb. 24, 2000

(51) Int. Cl.[7] ............................................... G06F 12/00
(52) U.S. Cl. ........................ 711/200; 711/202; 707/206
(58) Field of Search ................................. 711/200, 202; 707/206

(56) References Cited

U.S. PATENT DOCUMENTS

| | | | |
|---|---|---|---|
| 5,457,793 A | 10/1995 | Elko et al. | 707/205 |
| 5,491,808 A | 2/1996 | Geist, Jr. | 711/100 |
| 5,555,399 A | 9/1996 | Waldron et al. | 711/159 |
| 5,706,461 A * | 1/1998 | Branstad et al. | 711/203 |
| 5,765,157 A | 6/1998 | Lindholm et al. | 707/101 |
| 5,765,174 A | 6/1998 | Bishop | 707/206 |
| 5,996,055 A * | 11/1999 | Woodman | 711/203 |
| 6,016,529 A * | 1/2000 | Woodman | 711/3 |

* cited by examiner

Primary Examiner—Reginald G. Bragdon
Assistant Examiner—Mehdi Namazi
(74) Attorney, Agent, or Firm—Duke W. Yee; Volel Emile; Lisa L. B. Yociss (57) ABSTRACT

Initially, data is copied from a disk to a page frame and then to a read buffer, for instance. Next, a check is made to determine whether the percent of real memory occupied by file pages is less than a preset maximum volume. If so, no space is allocated for additional file page and no page frames are returned to the free list. If not, the VMM selects the best candidate file pages in real memory and returns them to the free list. Ideal candidates are a thread's memory pages, from a thread doing sequential I/O the file system. In so doing, the page frames are added to the free list as soon as the I/O is complete.

41 Claims, 5 Drawing Sheets

METHOD TO INCREASE PERFORMANCE OF ACQUIRING FREE MEMORY PAGES

BACKGROUND OF THE INVENTION

1. Technical Field

The present invention relates to system memories. More particularly, the present invention relates to optimizing memory throughput.

2. Description of Related Art

The UNIX operating system, or "UNIX," "A weak pun on Multics," is an interactive time-sharing operating system invented in 1969 by Ken Thompson after he left Bell Labs and the Multics project, apparently to play games on his scavenged PDP-7 computer (minicomputer sold by Digital Electric Corp. (DEC), (Compaq Computer Corp., 20555 SH 249, Houston, Tex. 77070)). Thompson developed a new programming language 'B', and Dennis Ritchie enhanced 'B' to 'C' and helped develop 'UNIX'.

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data) and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit and response time degrades.

In UNIX operating systems, each user is presented with a shell. This is a program that displays the user prompt, handles user input, and displays output on the terminal. The shell program provides a mechanism for customizing each user's setup requirements and storing this information for re-use (in a file called profile).

When the UNIX operating system starts up, it also starts a system process (getty), which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called i-node numbers, are used only within the UNIX operating system kernel itself. While UNIX uses i-node numbers to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding i-node numbers. Given the name of a file, UNIX looks in the file's directory and obtains the corresponding i-node number for the file. With this i-node number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct i-node is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of –1 indicates an error of some sort. For writing, the value returned is the number of bytes actually written. An error has occurred if this is not equal to the number that was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

The Virtual Memory Manager (VMM) provides the virtual memory facilities that are used by the other parts of the system. One of the VMM's jobs is to provide memory pages to threads. In order to do this, the VMM maintains a list of free memory pages called the free list. When the free list is depleted the VMM has to steal memory pages from threads to replenish the free list. A least recent used (LRU) algorithm is used to determine which pages to steal. This method of acquiring free pages does not scale well and is not able to steal pages fast enough when threads have sustained needs for pages at a high rate.

It would be advantageous to provide page frames at a higher rate. It would be further advantageous to reduce the reliance on stealing pages for memory space.

SUMMARY OF THE INVENTION

The present invention solves the problem of the virtual memory manager having to replenish the free list by having the file system declaim memory pages as soon as an I/O is complete for threads doing sequential I/O. Initially, a check is made to determine whether space is available in the real memory for page frame(s) used for the data. The free list is checked for available page frames, if it is empty the VMM must steal pages in order to replenish the free list and make a page frame available for the data. The VMM then accesses the free list for free page frame(s) and copies the data to the page frame. The data is finally copied to a read buffer. The VMM then attempts to return page frames to the free list rather than immediately accessing more data. First, a check is made to determine whether the percent of real memory occupied by file pages is less than a preset maximum volume. If so, no space is allocated for additional file page and no page frames are returned to the free list. If not, the VMM selects the best candidate file pages in real memory and returns them to the free list. Ideal candidates are a thread's memory pages, from a thread doing sequential I/O the file system. In so doing, the page frames are added to the free list as soon as the I/O is complete.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
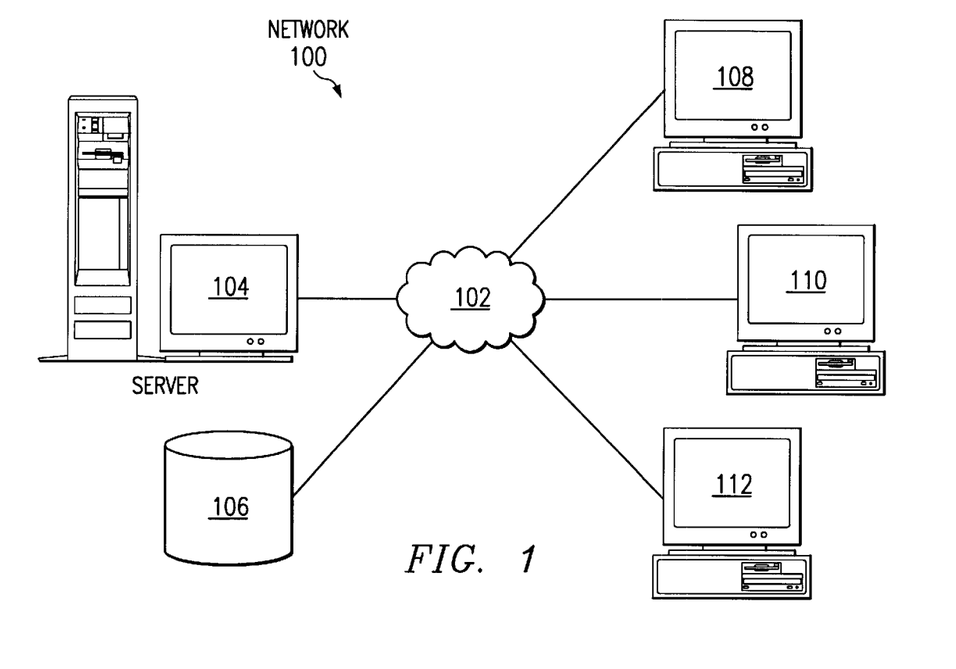
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
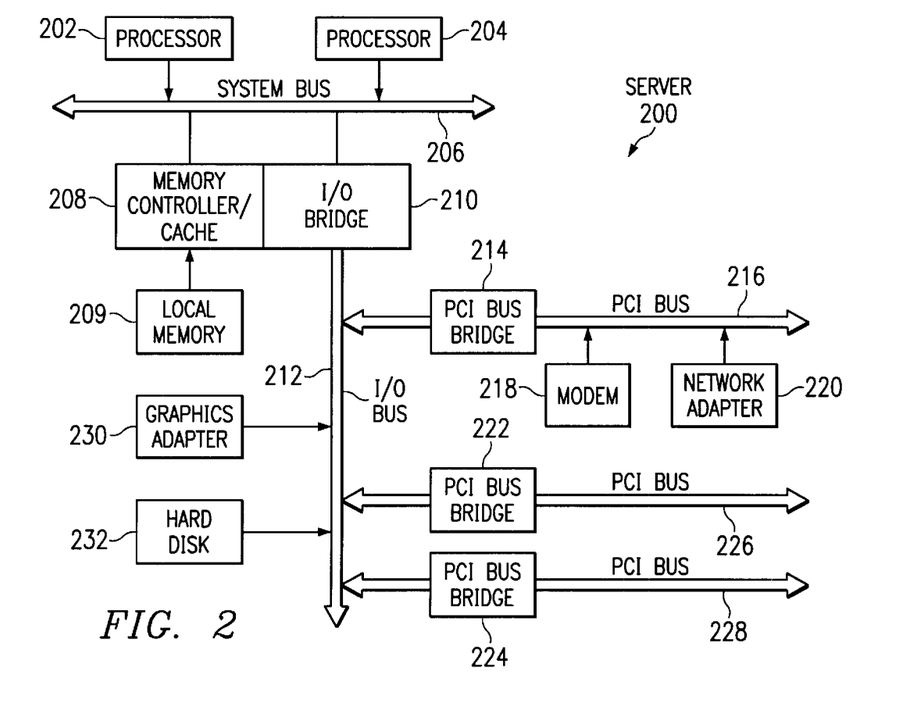
FIG. 2 is a block diagram depicting a data processing system that may be implemented as a server in accordance with a preferred embodiment of the present invention.

Referring to FIG. 2, a block diagram depicting a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
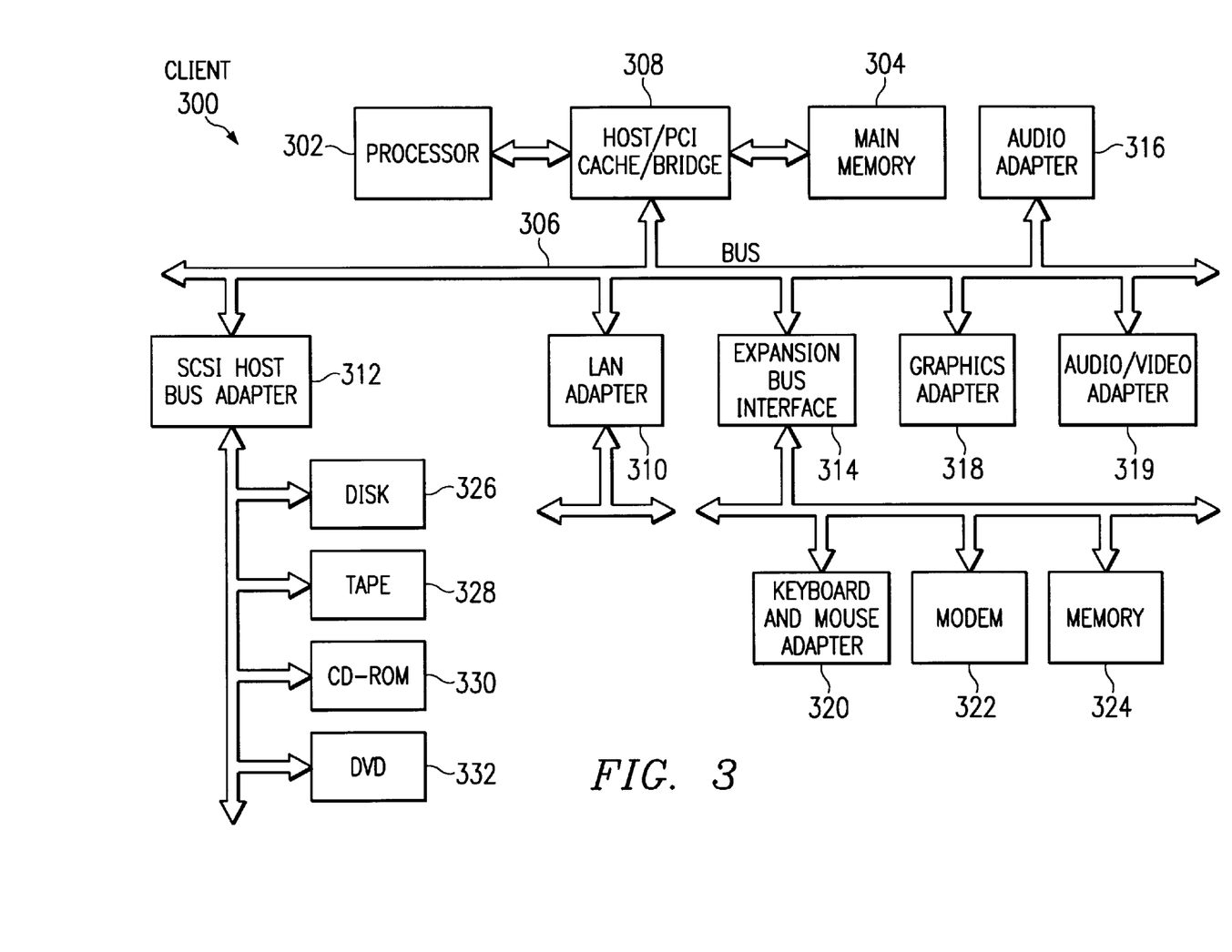
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

Neither the depicted example in FIG. 3 nor the above-described examples are meant to imply architectural limitations.

As mentioned above, the virtual memory manager (VMM) provides the virtual memory facilities that are used by the other parts of the system to implement the following:

Virtual address space of processes
Sharing of executables
Shared memory segments
Mapped files The VMM implements virtual memory, allowing the creation of segments larger than the physical memory available in the system. The segments are divided into fixed-size units called pages. Each page in a segment can be in physical memory or stored on disk until a thread needs it. When a process accesses a page that is not present in physical memory, the VMM reads the page into memory; this is called a PageIn. When physical memory is not available, the VMM writes pages to a disk; this is called a PageOut or PageSteal.

The VMM maintains a list of free memory pages called the free list. The free list contains real memory pages that do not belong to working storage segments or program text segments, and thus are available for use by a thread. When the free list is depleted (there are no free memory pages) the VMM has to perform a PageSteal and steal memory pages from threads to replenish the free list. In many prior art systems a least recent used (LRU) algorithm is used to determine which pages to steal. This method of acquiring free pages does not scale well and is not able to steal pages fast enough when threads have sustained needs for pages at a high rate.

Most UNIX-based operating systems memory map files. On these systems, a common scenario where a thread has a sustained need for new memory pages at a high rate is when a thread is reading or writing a large file sequentially. The requirement can be as high as 18MBps when doing I/O to one disk to over 100MBps when doing I/O to striped disks. These rates are easily achievable while there are pages on the free list, but the throughput drops off dramatically when the free list is depleted. In that case, the VMM may be forced to continually perform PageSteals in order to keep up with the need for new memory pages, consequently, the throughput requirement cannot easily be met. This remains true even when the thread is performing a sequential file I/O, where pages behind the currently read one are not accessed again, but still held in memory.

Most systems that memory map files have a limit on the maximum number of file page frames allowed in cache. Maxperm is the preferred upper bound of the percentage of real memory used to hold file pages. In accordance with a preferred embodiment of the present invention, if the percentage real memory occupied by file page frames is at least equal to Maxperm, and a thread is doing sequential I/O, then the filesystem could declaim the thread's memory pages as soon as an I/O is complete. This would free up memory pages as fast as the thread is able to do I/O. Having the file system declaim memory pages is much more efficient than having the VMM search all of the memory for the LRU pages to steal. The efficiency is particularly good for file I/O that is sequential, where pages behind the currently read one are not accessed again.

In accordance with a preferred embodiment of the present invention, a filesystem declaims memory pages as soon as an I/O is completed for threads doing sequential I/O when the percentage of file page frames in real memory has reached Maxperm. In so doing, unneeded file pages, i.e., file pages that will not be accessed again, will not hold a file page in memory.

Figure 4:
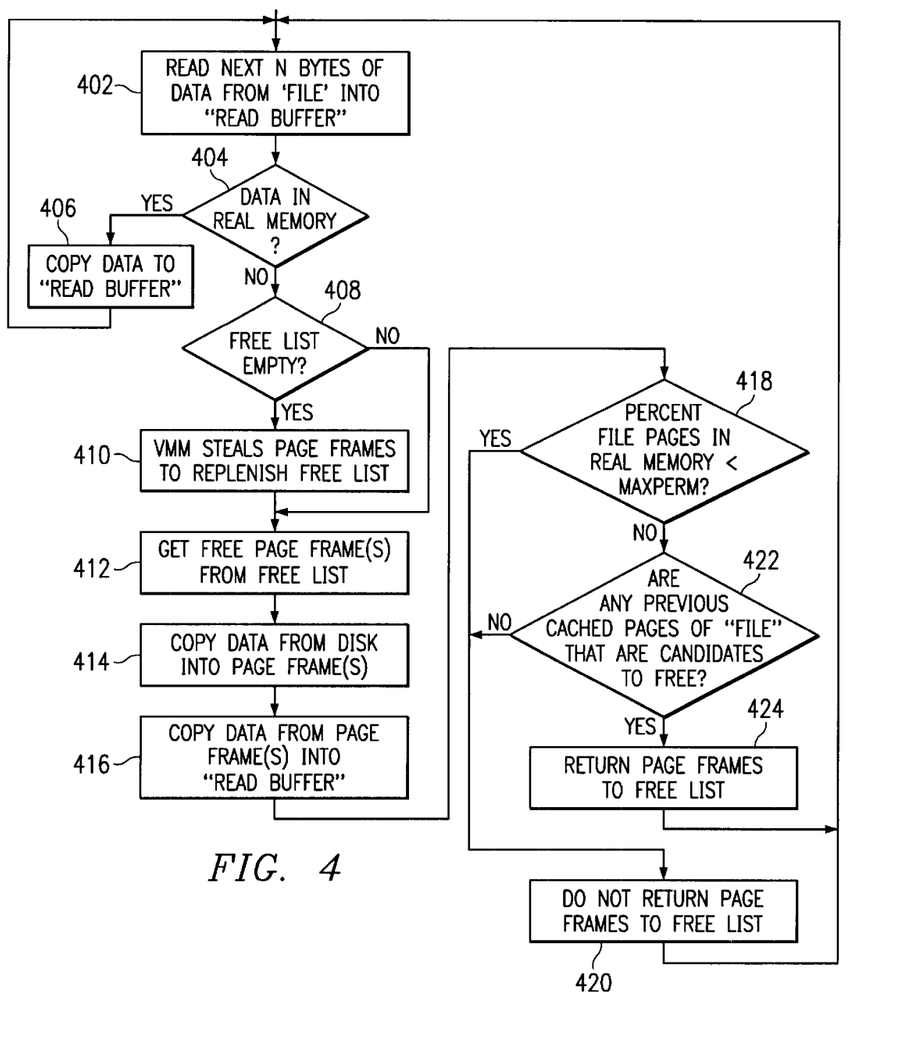
FIG. 4 is a flowchart depicting a process for providing a thread doing an I/O while freeing file pages in accordance with a preferred embodiment of the present invention.

FIG. 4 is a flowchart depicting a process for providing a thread doing an I/O while freeing file pages in accordance with a preferred embodiment of the present invention. While the present invention is described in with respect to a thread reading a file sequentially, the thread may instead be writing a file sequentially. The depicted process is a recursive operation illustrating the steps transpiring during a file I/O. A convenient starting point in the process is where the next N bytes of data are to be read from the file into a read buffer (step 402). Initially, a check is made to determine whether the N bytes of data are in the real memory (step 404). If so, they are copied from the real memory to the read buffer (step 406) and the process returns to step 402 for reading the next N bytes.

Returning to step 404, should the N bytes of data not be available from the real memory, then the data must be accessed from a disk. The data cannot be copied directly from the disk to the read buffer, but must first be paged to a frame page in the real memory. A check is made to determine whether space is available in the real memory for page frame(s) for the N bytes of data. The VMM tracks available memory using a free list, so the free list is checked to determine if it is empty (step 408). If the free list is empty, then no page frames are available for holding the N bytes of data from the disk. In that case, the VMM is forced to issue a PageSteal to replenish the free list and make a page frame available for the data from the disk (step 410).

Real memory space is allocated between file pages and executables. Maxperm is defined as the preferred upper bound of the percentage of real memory used to hold file pages. Upon the issuance of a PageSteal the VMM checks percentage of file pages currently residing in real memory against Maxperm. If the percentage of file pages currently residing in real memory is less than Maxperm, the VMM will steal the least recently used page frame in real memory regardless of whether that page frame is a file page or an executable. However, if the percentage of file pages currently in real memory is not less than Maxperm then the VMM will only steal the least recently used file page in real memory. A PageSteal reduces the overall system performance because the VMM must search the entire real memory for pages to steal.

After the free list contains a sufficient number of page frame(s) for storing the data, the VMM accesses the free list for free page frame(s) (step 412). Next, the VMM issues a PageIn causing the data to be copied to the page frame listed in the free list (step 414). The data is then copied to the read buffer (step 416).

A prior art I/O READ operation would then return to step 402 for accessing more data. Contrary to the prior art and in accordance with a preferred embodiment of the present invention, the VMM attempts to return page frames to the free list rather than immediately accessing more data. If the VMM can return a page frame to the free list then a PageSteal operation may be avoided because the free list is not empty. Therefore the system performance is increased because it is not necessary for the VMM to search the entire real memory for a page to steal.

However, the allocation of real memory between file pages and executables defined by Maxperm must be preserved. The VMM will return file pages to the free list only if the percentage of file pages in real memory is less than the value of Maxperm. Therefore, a check is performed to determine whether the percentage of file pages in real memory is less than the value of Maxperm (step 418). No page frames are returned to the free list if the percentage of file pages in real memory is less than the value of Maxperm (step 420). The process the returns to step 402 for accessing more data.

Returning to step 418, file page frames can be freed from real memory and added to the free list only if the percentage of real memory occupied by file pages is not less than Maxperm. However, not every page frame can be freed and returned t the free list. File page frames that might be used again cannot be freed. If a file page frame is freed and then needed, that page frame must be recopied from disk rather than simply reading them from real memory. Therefore, only file pages that will not accessed from the real memory are candidates for being returned to the free list. Thus, a determination is made as to whether any of the previously cached pages of the file being I/Oed are candidates to be freed (step 422).

Candidates to be freed are those memory pages that will not be accessed again from real memory. In accordance with a preferred embodiment of the present invention a filesystem may declaim memory pages as soon as an I/O is complete for threads doing the sequential I/O. These memory pages would end up behind the next currently read page and could not be accessed again. Therefore, if the current file I/O operation is sequential, then all of the current file's page frames are candidates for freeing. Any of the current file's page frames stored real memory may be removed and added to the free list. In so doing, memory pages are freed up as fast as the thread is able to do I/Os. The candidate page frames are then added to the free list (step 424).

It is importantly to note that the present invention allows page frames that cannot be read from real memory to be immediately returned to the free list. Consequently, unreadable file page frames do not populate real memory and the need for PageSteals are reduced because page frames are freed as soon as an I/O is complete.

Returning to step 424, the process continues by returning to step 402 and accessing more data. However, because candidate pages have been freed from cache, the free list is no longer empty and the VMM will not be required to search the entire real memory for a page frame to steal in order to replenish the free list.

Returning to step 422, if the previously cached pages of the file being I/Oed are not candidates to be freed, the process does not return any page frames to the free list (step 420). The process then returns to step 402 for accessing more data.

The preferred embodiment of the present invention described above in FIG. 4 above checks for candidate pages each time a file page frame is copied from disk, provided the amount of file pages in real memory is greater than Maxperm. While this process increases processor efficiency by reducing the number of PageSteals performed by the VMM, processor efficiency is further increased by checking for candidate page frames only when the number of free pages on the free list drops below a threshold amount.

Figure 5:
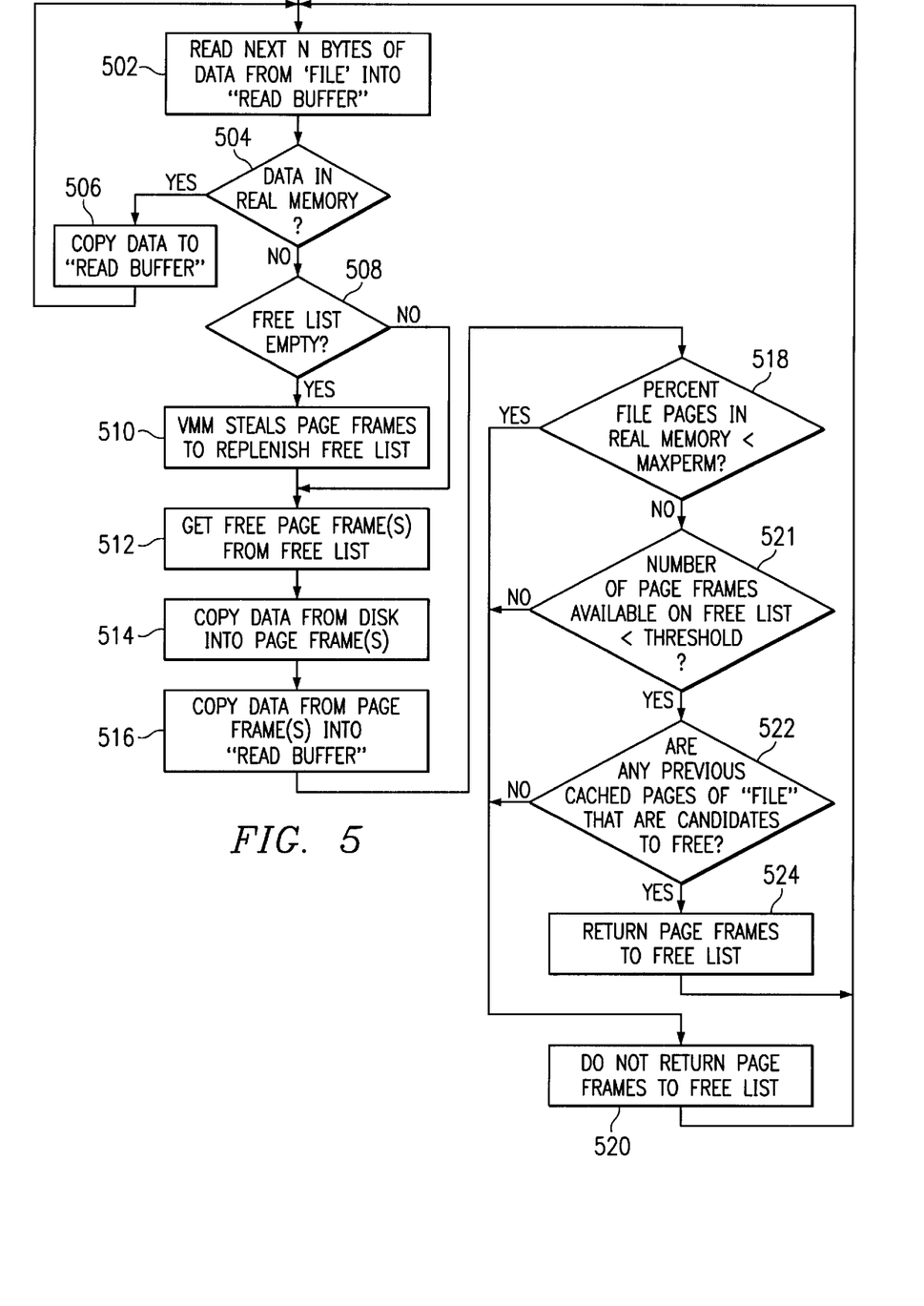
FIG. 5 is a flowchart depicting a process for providing a thread doing an I/O while freeing file pages only when the number of free file page drops below a threshold amount in accordance with a preferred embodiment of the present invention.

FIG. 5 is a flowchart depicting a process for providing a thread doing an I/O while freeing file pages only when the number of free file page drops below a threshold amount in accordance with a preferred embodiment of the present invention. The process is similar to that described above with respect to FIG. 4. Again, a convenient starting point in the process is where the next N bytes of data are to be read from the file into a read buffer (step 502). The real memory is checked to determine whether the N bytes of data are already available from the real memory (step 504). If the data is in real memory it is copied directly to the read buffer (step 506) and the process restarts at step 502 where the next N bytes are read from the read buffer. If the N bytes of data are not currently stored in the real memory, then the N bytes are accessed from a disk in the following steps. The free list is checked to determine if it is empty (step 508).

If the free list it is empty the VMM issues a PageSteal that replenishes free memory pages to the free list by searching the entire real memory for suitable memory pages to return to the free list (step 510). If, on the other hand, the free list is not empty the VMM does not perform the PageSteal. Once free page frames are available on the free list the VMM accesses the free list for the free page frame(s) (step 512). The VMM copies to the page frame listed in the free list (step 514) and the data is then copied to the read buffer (step 516).

As discussed above with respect to FIG. 4, the percentage of real memory occupied by file page is compared to Maxperm (step 518). If it is not less than Maxperm, no file page frames are returned to the free list (step 520).

However, while the percentage file pages in the real memory may not be less than Maxperm, there may already be a sufficient number of page frames on the free list to accommodate the current page frame from the file being I/Oed. Hence, there is not an urgent need to look for file page frames to free. Therefore, in order to reduce the number of times the processor checks for previously cached pages of the file, number of pages on the free list is first checked against a threshold amount of free page frames (step 521). Should the number of pages be above the threshold amount, then there is no immediate need to return more pages free list. No page frames are returned to the free list (step 520) and the process returns to step 502.

If, on the other hand, the check at step 521 reveals that the number of page frames on the free list has dropped below the threshold amount, then the process continues as described above in FIG. 5. A determination is made as to whether any of the previously cached pages of the file being I/Oed is a candidate to be freed (step 522) and the candidate page frames are added to the free list (step 524). The process returns to step 502. However, if the previously cached pages of the file being I/Oed are not candidates to be freed, the process does not return page frame to the free list (step 520) and again returns to step 502 for accessing more data.

Figure 6:
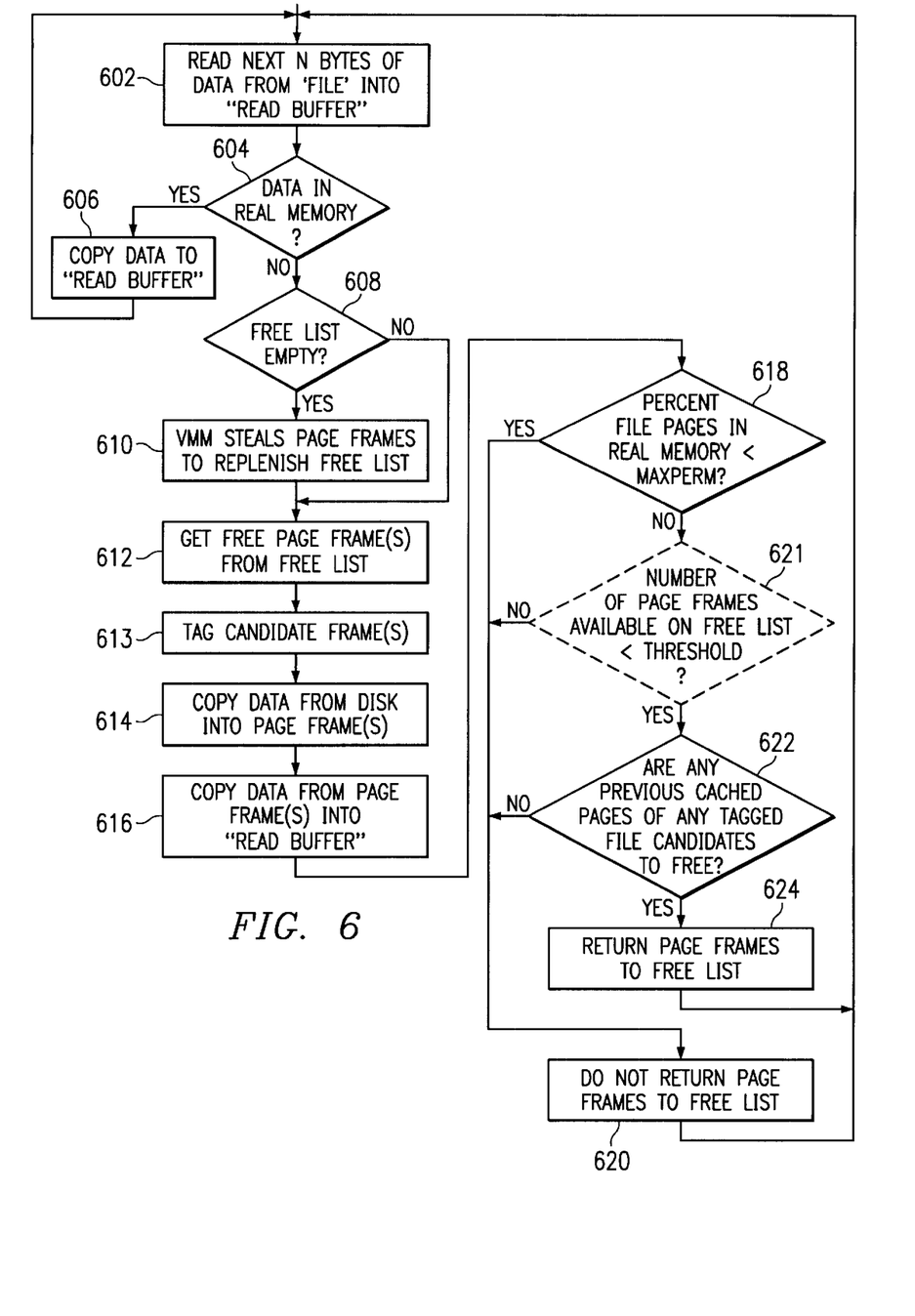
FIG. 6 is a flowchart depicting a further refinement to the process for providing a thread doing an I/O while freeing file pages.

FIG. 6 is a flowchart depicting a further refinement to the process for providing a thread doing an I/O while freeing file pages. While the above described embodiments greatly reduce the number of times the VMM must perform a PageSteal on page frames that will never be accessed (candidate page frames), cases still exist where candidate page frames take up valuable real memory. For instance, in cases where the percentage of file pages in the real memory is below Maxperm. In those cases, files containing candidate page frames are cached to real memory. The VMM is must then search the entire real memory looking for least recently used pages in order to ferret them out. Once the file I/O has been completed and the file is in real memory, the filesystem cannot declaim it because the filesystem has no way to determine whether the file page frames will be needed again. The filesystem can only determine if a file page frames for the file currently being I/Oed are candidates. Once the file I/O is completed the filesystem cannot declaim the file page frames in memory and they must be removed with a PageSteal. Therefore, in accordance with another preferred embodiment of the present invention, page frames are tagged as candidate files as the file is being I/Oed.

Referring to FIG. 6, steps 602–612 and 614–624 correlate to steps 502–512 and 514–524 in FIG. 5 and will not be discussed in detail again. As the process proceeds through steps 602–612, the free list is accessed for a free page frame. The VMM has determined whether or not the thread is doing the sequential I/O, i.e. whether or not the page frames are candidate page frames. Candidate page frames are then tagged step 613). The VMM then copies to the page frame listed in the free list whether the page frame is a candidate or not (step 614) and the data is then copied to the read buffer (step 616). The percentage of real memory occupied by file page is compared to Maxperm (step 618) and no file page frames are returned to the free list if the percentage is less than Maxperm, (step 620). Conversely, if the percentage of real memory occupied by file page frames is not less than Maxperm, then a check is made to determine if the number of pages on the free list is first is less than threshold amount (step 621). The threshold amount represents the lowest number of free page frames on the free list necessary for not returning page frames to the free list. Step 621 is optional and the process may flow directly to step 622 without checking the number of page frames available on the free list. If the check is made and the number of pages on the free list is above the threshold amount, then no page frames are returned to the free list (step 620) and the process returns to step 602.

If the number of pages on the free list is not above the threshold amount, a determination is made as to whether any of the previously cached pages are tagged as candidate pages for freeing (step 622). Here, rather than merely checking the current file being I/Oed, the entire real memory is searched for candidate file page frames. However, while the entire real memory is being searched, similar to a PageSteal, candidate page frames are flagged and thereby easily identified. Moreover, page frames other than those used for the current file being I/Oed can identified in memory as candidate page frames. Thus, while the processor may perform an additional memory search for candidate page frames, the search is less complicated than a PageSteal search. More importantly, a greater number of candidate page frames may be returned to the free list than in the previous embodiments because page frames from files other than the current file are returned (step 624) and the process returns to step 602. However, if the current cached pages of the file being I/Oed are not candidates to be freed, the process does not return page frame to the free list (step 620) and again returns to step 602 for accessing more data.

Although developed on AIX, the principles here are easily extendible to any other UNIX-based system, including LINUX, Solaris, and others. More importantly, the underlying process from which the permission bit security tool is based is usable in other operating systems other than those with a UNIX flavor. The concept of constant monitoring for permission bit hacks is both new and unique and will undoubtedly find favor with anyone running mission-critical applications.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, CD-ROMs, and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for increasing performance comprising:

storing at least a portion of data file to a memory page;

ascertaining if the memory page is a candidate for freeing by determining if a quantity of free memory pages in a memory is below a free memory space threshold value relating to the amount of free memory space in a second memory; and designating the memory page as a free memory page based on the memory page being a candidate for freeing.

2. The method recited in claim 1, wherein ascertaining if the memory page is the candidate for freeing further comprises:

determining if the memory page is one of a sequence of memory pages containing data from the data file.

3. The method recited in claim 2, wherein ascertaining if the memory page is the candidate for freeing further comprises:

comparing an amount of a type of memory pages in a memory to a memory type threshold value relating to the amount of a type of memory pages in the memory.

4. The method recited in claim 1, wherein prior to ascertaining if the memory page is the candidate for freeing the method further comprises:

tagging the memory page as a candidate for freeing memory page.

5. The method recited in claim 4, wherein ascertaining if a memory page is a candidate for freeing further comprises:

searching the memory for a tagged memory page.

6. A method for increasing performance comprising:

specifying a free memory page;

inputting at least a portion of data to be output from a first memory to the memory page;

outputting the at least a portion of data output from the memory page;

testing content of a second memory by comparing an amount of a type of memory pages in the second memory to a memory type threshold value relating to an amount of a type of memory pages in the second memory;

ascertaining if the memory page is a candidate for freeing; and designating the memory page as a free memory page based on the memory page being a candidate for freeing.

7. The method recited in claim 6, wherein ascertaining if the memory page is the candidate for freeing further comprises:

determining if the memory page is one of a sequence of memory pages containing data to be output.

8. The method recited in claim 6, wherein the second memory is real memory.

9. A method for increasing performance comprising:

specifying a free memory page by: receiving a request for data to be output, accessing a free list, containing identities of a plurality of free memory pages in a first memory, identifying a memory page from the free list; and removing the memory page from the free list of memory pages in the first memory;

inputting at least a portion of data to be output from the first memory to the memory page;

outputting the at least a portion of data output from the memory page;

ascertaining if the memory page is a candidate for freeing; and designating the memory page as a free memory page based on the memory page being a candidate for freeing.

10. The method recited in claim 9, wherein prior to accessing the free list the method further comprises:

determining whether the requested data resides in the second memory.

11. The method recited in claim 9, wherein prior to assessing the free list the method further comprises:

determining whether the free list is empty.

12. The method recited in claim 11, further comprises:

stealing a substitute memory page from the first memory in response to the free list being empty.

13. The method recited in claim 11, further comprises:

determining a least recently used memory page in the first memory in response to the free list being empty;

stealing the least recently used memory page from the first memory; and adding the least recently used memory page to the free list.

14. A method for increasing performance comprising:

specifying a free memory page;

inputting at least a portion of data to be output from a first memory to a memory page;

outputting the at least a portion of data output from the memory page;

ascertaining if the memory page is a candidate for freeing by determining if a quantity of free memory pages in a second memory is below a free memory space threshold value relating to the amount of free memory space in the second memory; and designating the memory page as a free memory page based on the memory page being a candidate for freeing.

15. The method recited in claim 6, wherein prior to ascertaining if a memory page is a candidate for freeing the method further comprises:

copying at least a portion of the requested data from a second memory to the memory page; and tagging the memory page as a candidate memory page.

16. The method recited in claim 15, wherein ascertaining if a memory page is a candidate for freeing further comprises:

searching the second memory for a tagged memory page.

17. A method for increasing performance comprising:

specifying a free memory page;

inputting at least a portion of data to be output from a first memory to a memory page;

outputting the at least a portion of data output from the memory page;

copying at least a portion of the requested data from a second memory to the memory page;

tagging the memory page as a candidate memory page;

ascertaining if the memory page is a candidate for freeing;

designating the memory page as a free memory page based on the memory page being a candidate for freeing;

determining if a total quantity of free memory pages in the second memory is below a free memory space threshold value relating to the amount of free memory space in the first memory; and based on the total quantity of free memory pages in a first memory being below the free memory space threshold value and subsequent to ascertaining if the memory page is a candidate for freeing, searching the first memory for tagged memory pages.

18. A method for increasing performance comprising:

sequentially copying a portion of data from a memory device to a memory page;

removing the memory page from free list free of memory pages residing in real memory;

outputting the portion of data from the memory page; and returning the memory page to the free list based on the portion of data being sequentially copied to the memory page.

19. A system for increasing performance comprising:

storing means for storing at least a portion of a data file to a memory page;

ascertaining means for ascertaining if the memory page is a candidate for freeing by determining means for determining if the memory page is one of a sequence of memory pages containing data from the file, comparing means for comparing an amount of a type of memory pages in a second memory to a memory type threshold value relating to an amount of a type of memory pages in the second memory; and designating means for designating the memory page as a free memory page based on the memory page being a candidate for freeing.

20. The system recited in claim 19, wherein ascertaining means for ascertaining if a memory page is a candidate for freeing, further comprises:

determining means for determining if a quantity of free memory pages in a memory is below a free memory space threshold value relating to the amount of free memory space in the second memory.

21. The system recited in claim 19, further comprises:

tagging means for tagging the memory page as a candidate for freeing memory page.

22. The system recited in claim 21, wherein the ascertaining means for ascertaining if a memory page is a candidate for freeing further comprises:

searching means for searching the memory for a tagged memory page.

23. A system for increasing performance comprising:

means for specifying a free memory page;

means for inputting at least a portion of data to be output from a first memory to a memory page;

means for outputting the at least a portion of data output from the memory page;

means for ascertaining if the memory page is a candidate for freeing;

means for designating the memory page as a free memory page based on the memory page being a candidate for freeing; and means for testing content of a second memory including means for comparing an amount of a type of memory pages in the second memory to a memory type threshold value relating to an amount of a type of memory pages in the second memory.

24. The system recited in claim 23, wherein the means for ascertaining if the memory page is the candidate for freeing further comprises:

means for determining if the memory page is one of a sequence of memory pages containing data to be output.

25. The system recited in claim 23, wherein the second memory is real memory.

26. The system recited in claim 23, the means for ascertaining if a memory page is a candidate for freeing, further comprises:

means for determining if a quantity of free memory pages in a second memory is below a free memory space threshold value relating to the amount of free memory space in the second memory.

27. The system recited in claim 23, the system further comprises:

means for copying at least a portion of the requested data from a second memory to the memory page; and means for tagging the memory page as a candidate memory page.

28. The system recited in claim 27, the means for ascertaining if a memory page is a candidate for freeing further comprises:

means for searching the second memory for a tagged memory page.

29. The system recited in claim 27, further comprises:

means for determining if a total quantity of free memory pages in the second memory is below a free memory space threshold value relating to the amount of free memory space in the first memory;

means for searching the first memory for tagged memory pages based on the total quantity of free memory pages in the first memory being below a free memory space threshold value.

30. A system for increasing performance comprising:

means for specifying a free memory page including means for receiving a request for data to be output, means for accessing a free list containing identities of a plurality of free memory pages in a first memory, means for identifying a memory page from the free list, and means for removing the memory page from the free list of memory pages in the first memory;

means for inputting at least a portion of data to be output from the first memory to the memory page;

means for outputting the at least a portion of data output from the memory page;

means for ascertaining if the memory page is a candidate for freeing; and means for designating the memory page as a free memory page based on the memory page being a candidate for freeing.

31. The system recited in claim 30, wherein means for accessing the free list the system further comprises:

means for determining whether the requested data resides in the second memory.

32. The system recited in claim 30, the means for assessing the free list the system further comprises:

means for determining whether the free list is empty.

33. The system recited in claim 32, further comprises:

means for stealing a substitute memory page from the first memory in response to the free list being empty.

34. The system recited in claim 32, further comprises:

means for determining a least recently used memory page in the first memory in response to the free list being empty;

means for stealing the least recently used memory page from the first memory; and means for adding the least recently used memory page to the free list.

35. A system for increasing performance of acquiring free memory pages comprising:
    means for sequentially copying a portion of data from a memory device to a memory page;
    means for removing the memory page from a list free of memory pages reside in real memory;
    means for outputting the portion of data from the memory page; and
    means for returning the memory page to the free list based on the portion of data being sequentially copied to the memory page.

36. A computer program product for increasing performance comprising:
    storing instruction for storing the at least a portion of data file to a memory page;
    ascertaining instruction for ascertaining if the memory page is a candidate for freeing by determining if the memory page is one of a sequence of memory pages containing data from the file, and comparing an amount of a type of memory pages in a second memory to a memory type threshold value relating to the amount of a type of memory pages in the second memory; and
    designating instructions for designating the memory page as a free memory page based on the memory page being a candidate for freeing.

37. The computer program product recited in claim 36, wherein ascertaining if the memory page is a candidate for freeing, further comprises:
    determining instructions for determining if a quantity of free memory pages in a memory is below a free memory space threshold value relating to the amount of free memory space in the second memory.

38. The computer program product recited in claim 36, further comprises:
    tagging instructions for tagging the memory page as a candidate memory page.

39. The computer program product recited in claim 38, the ascertaining instruction for ascertaining if a memory page is a candidate for freeing further comprises:
    searching instructions for searching the memory for a tagged memory page.

40. A computer program product for increasing performance of acquiring free memory pages comprising:
    instruction means for specifying a free memory page;
    instruction means for inputting at least a portion of data to be output from a first memory to a memory page;
    instruction means for outputting the at least a portion of data output from the memory page;
    instruction means for ascertaining if the memory page is a candidate for freeing;
    instruction means for designating the memory page as a free memory page based on the memory page being a candidate for freeing; and
    instruction means for testing content by comparing an amount of a type of memory pages in a second memory to a memory type threshold value relating to an amount of a type of memory pages in the second memory.

41. A computer program product for increasing performance of acquiring free memory pages comprising:
    instruction means for sequentially copying a portion of data from a memory device to a memory page;
    instruction means for removing the memory page from a list free of memory pages reside in real memory;
    instruction means for outputting the portion of data from the memory page; and
    instruction means for returning the memory page to the free list based on the portion of data being sequentially copied to the memory page.

* * * * *

UNITED STATES PATENT AND TRADEMARK OFFICE
CERTIFICATE OF CORRECTION

PATENT NO. : 6,598,143 B1
DATED : July 22, 2003
INVENTOR(S) : Baker et al.

It is certified that error appears in the above-identified patent and that said Letters Patent is hereby corrected as shown below:

Column 13,
Line 33, delete "a memory" and insert -- the memory --.
Line 33, delete "a candidate" and insert -- the candidate --.

Column 14,
Lines 12-13, delete "the second" and insert -- a second --.
Line 41, delete "claim 6" and insert -- claim 14 --.
Line 42, delete "a candidate" and insert -- the candidate --.
Lines 44-45, delete "a second" and insert -- the second --.

Column 15,
Line 13, after "from" insert -- a --.
Line 44, delete "a memory" and insert -- the memory --.
Line 46, delete "a tagged" and insert -- the tagged --.

Column 16,
Line 22, delete "a tagged" and insert -- the tagged --.
Line 53, delete "the second" and insert -- a second --.

Column 18,
Line 4, delete "a memory" and insert -- the memory --.
Line 29, delete "list free" and insert -- free list --.

Signed and Sealed this

Seventeenth Day of February, 2004

JON W. DUDAS
*Acting Director of the United States Patent and Trademark Office*